March 19, 1929.      L. K. BRAREN      1,705,957
ENGRAVING MACHINE
Filed Dec. 31, 1923      2 Sheets-Sheet 2
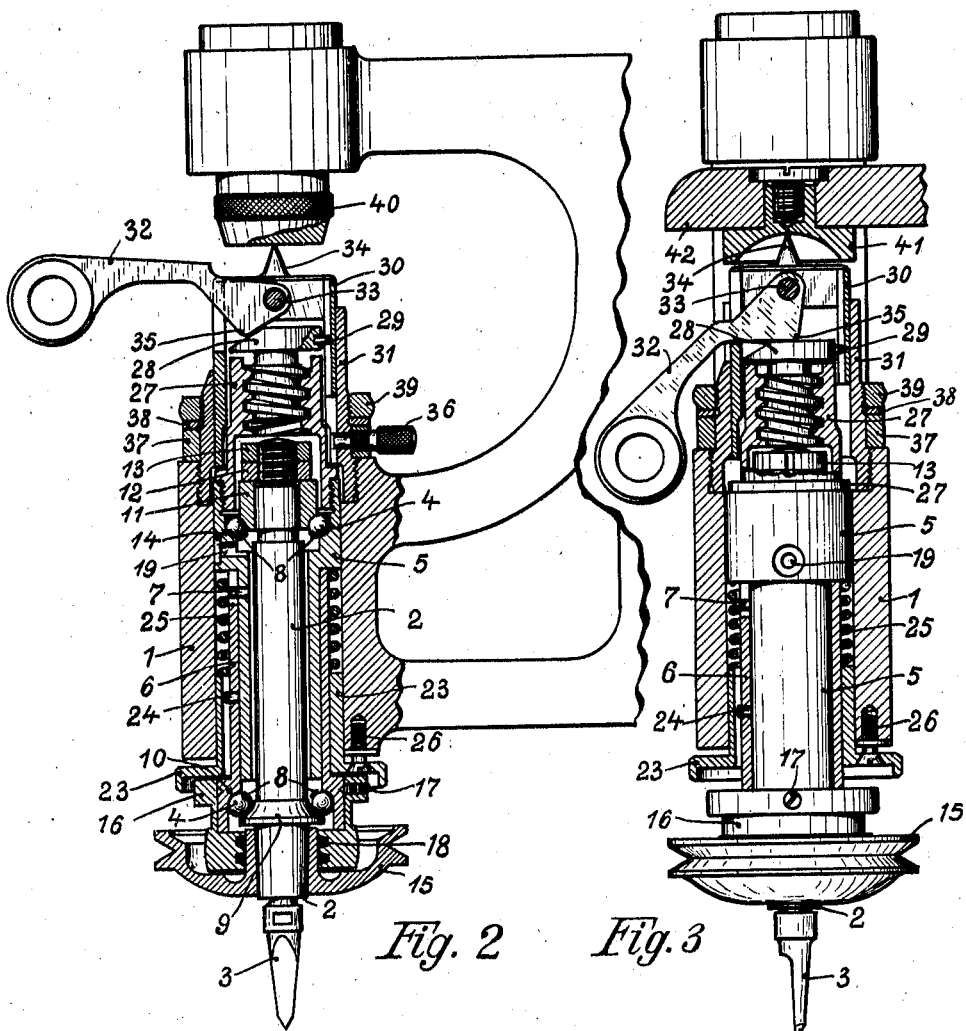
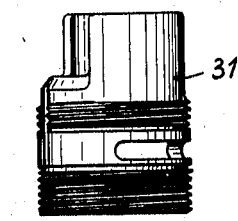
Fig. 7
Inventor
Lorenz Konrad Braren
by Frederick S. Church
his Attorney Patented Mar. 19, 1929.

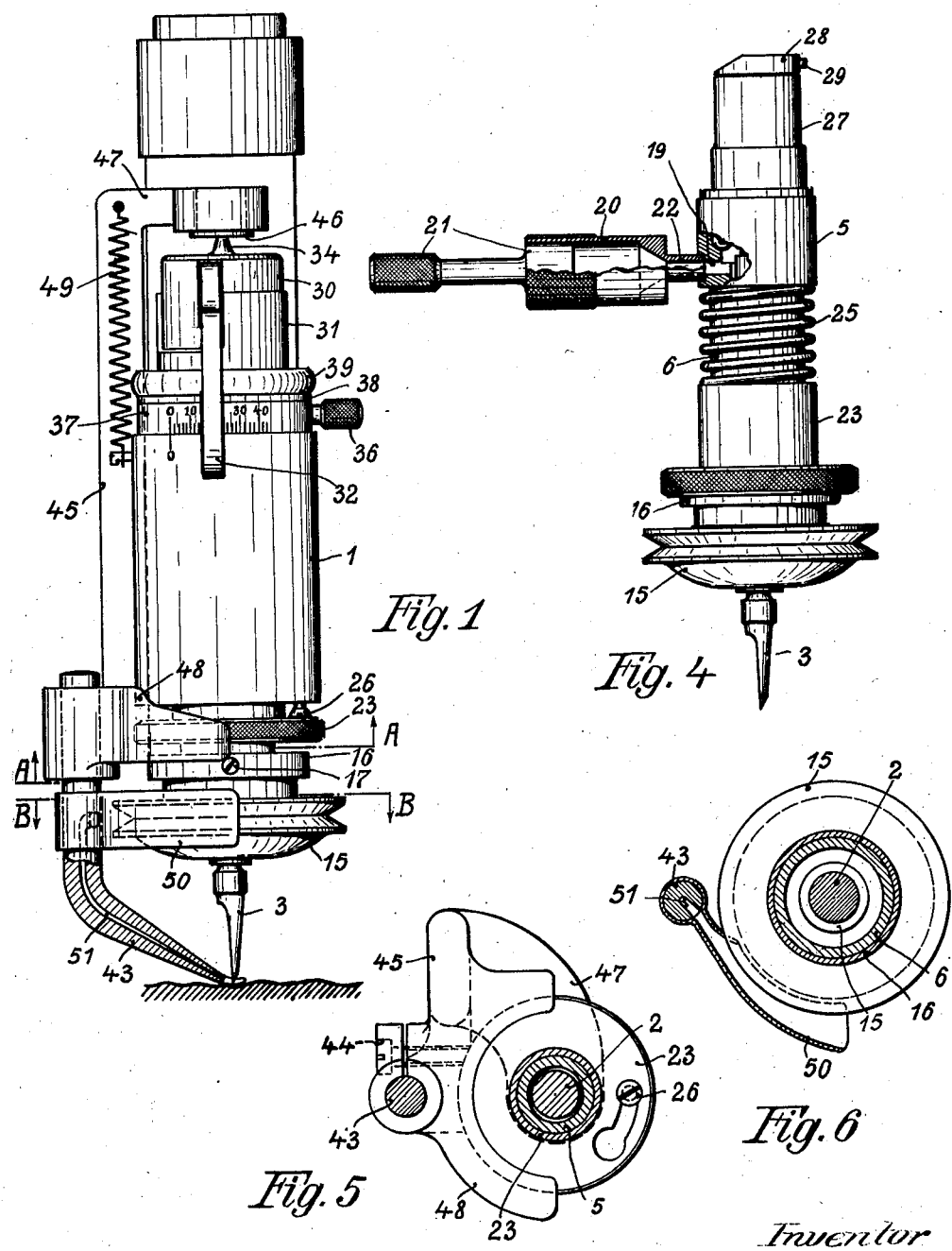

1,705,957

UNITED STATES PATENT OFFICE.

LORENZ KONRAD BRAREN, OF MUNICH, GERMANY, ASSIGNOR TO THE FIRM FRIEDRICH DECKEL, FABRIK FÜR PRÄZISIONS- MECHANIK UND MASCHINENBAU, OF MUNICH, GERMANY.

ENGRAVING MACHINE.

Application filed December 31, 1923, Serial No. 683,742, and in Germany February 19, 1923.

The object of my invention is to provide an improved type of bearing for the cutter spindle capable of rotating at high speeds, to provide an improved mechanism for raising and lowering this bearing whereby a fast and slow axial movement is controlled by a single member, and to provide improved adjustable means for limiting the depth to which the engraving cutter may enter into the material.

Another object of this invention is to construct the spindle bearing in such a way that the same may be removed very readily from the housing.

The spindle bearing furthermore is designed to be used alternately either with a fixed counter rest, or with a forming attachment for guiding the spindle vertically according to a predetermined curvature or with a different guiding attachment for making the cutter follow the small irregularities of the surface to be engraved.

The above and other improvements will be hereinafter fully described and claimed. In order that this my invention may be more readily understood reference is made to the accompanying sheets of drawings which show how the invention may be carried into practical effect.

Fig. 1 is a front view of the housing complete with bearing, vertical adjustment for the spindle and guiding attachment; Fig. 2 is a sectional front view at right angles to Fig. 1 but showing a stationary counterrest on top instead of the guiding attachment; Fig. 3 is a front view partly in section corresponding to Fig. 2 but showing the spindle in its lowest position and a forming attachment on top; Fig. 4 is a view of the bearing removed from the housing and shows the method of lubrication; Fig. 5 is a sectional end view according to the line A—A in Fig. 1; Fig. 6 is a sectional end view according to the line B—B in Fig. 1; Fig. 7 shows the bushing for adjusting the depth of cut.

The housing 1 with a suitable bore for the bearing is guided or carried by a pantographic system in case the engraving cutter is caused to move in relation to a fixed work table or remains stationary when the work carrier with the parts thereon perform the movements necessary for producing a design. The cutter spindle 2 with a conical seat for the cutter 3 is held by two rows of balls 4 against radial and axial movement in a bearing consisting of two bushings 5 and 6 which fit over each other, a pin 7 preventing any movement. The balls 4 are held in proper cages 8. A shoulder 9 on the spindle 2 near the lower end serves as the inner race while a corresponding seat 10 on the bushing 6 forms the outer race for the lower ball bearing. In a similar manner a bushing 11 held adjustably by a nut 12 and a checknut 13 is the inner and a seat 14 in the bushing 5 the outer race for the upper ball bearing. By constructing both bearings with angular contact it is possible to remove all radial and axial play of the spindle by adjusting the race 11 properly. A sheave 15 for driving the spindle fits with a slightly tapering seat over the lower end of the spindle, friction being sufficient to hold it in place and to transmit the turning moment required. To seal the bearing space against loss of lubricant a sleeve 16 is held by a setscrew 17 on to the bushing 6, two felt rings 18 rubbing against the hub of the driving sheave 15. A hole 19 is provided in the bushing 5 with a slight recess at the outside. After removing the complete bearing from the housing, which will be described later on, this hole serves for pressing grease with the help of a small grease gun 20 and a plunger 21 into the bearing without taking it apart, see Fig. 4. The reduced end 22 of the grease gun fits into an enlarged recess of the hole 19 thereby facilitating the process of filling the bearing with lubricant.

The bushing 5 fits slidingly in the bore of the housing 1, while the bushing 6 fits slidingly in a sleeve 23, a pin 24 fastened in the bushing 6 and entering a keyway of the sleeve 23 preventing rotation. The sleeve 23 which fits with its body into the bore of the housing 1 has a circular slot worked into a lower flange like portion with a large hole at one end and a seat for the head of a screw 26 at the other end. A spring 25 arranged between the sleeve 23 and a shoulder of the bushing 5 locks the head of the screw 26 entering this seat. The complete bearing may be removed from the housing by taking hold of the sleeve 23 lifting it somewhat against the pressure of the spring 25 and turning it until the head of the screw 26 is in line with the large opening. This is of particular advantage in the first place for filling the bearing quickly with lubricant as previously described and especially for removing the bearing with the cutter undisturbed from the machine and for placing the same into a special holder for grinding the cutter. Only in this way is it possible to produce an absolutely true running point, which is essential for the finest of hair line engravings, because small errors of misalignment are bound to arise when removing the cutter from its taper seat in the spindle and placing it in another taper seat for grinding.

The bushing 5 is provided at its upper end with an internal thread into which a cap 27 is screwed enclosing thus entirely the spindle. Coaxial with the spindle 2 a thread is cut into this cap and an adjusting screw 28 fits snugly therein. A pin 29 fastened into the head of the adjusting screw 28 slides in a groove of the sleeve 30, which again slides and turns in a bushing 31. The bushing 31 is screwed tightly to the housing 1 in line with the spindle 2. A lever 32 is pivoted on a pin 33, which is fastened in the walls of the sleeve 30. This lever protrudes through a slot in the sleeve 30 and the end is formed to rest easily in the hands of the operator. A point 34 is provided on top of the sleeve 30 to transfer the pressure of the spring 25 to a counter rest which may be of different shape and form for different purposes as will be described later on in detail. A vertical movement of the lever 32 causes a quick descent of the spindle, a cam like projection 35 depressing the adjusting screw 28 and the complete bearing, the spring 25 always holding the adjusting screw against the lever. A movement sideways of the lever turns the sleeve 30 and through the connecting pin 29 the adjusting screw 28, causing a movement in the thread whereby the spindle is moved up or down slowly. The cutter therefore is brought down quickly to the part to be engraved when depressing the lever 32 while a movement sideways regulates closely the depth of cut desired. To set the spindle, so that the cutter may only enter to a fixed depth, there is provided a stop pin 36 screwed into a setting ring 37 with a graduation on the outside cooperating with an index or zero point on the housing 1. A washer 38 and a nut 39 lock the ring 37 after adjustment has been made. The pin 36 projects into a recess cut into the sleeve 30 to limit the turning movement of this sleeve in one direction from the zero point and the position of the pin determines the extent of rotation of the sleeve 30 and therefore the screw which moves the spindle axially. By adjusting the pin radially through rotation of the ring 37 the distance of the pin from either extremity of the slot in the sleeve may be varied whereby rotation of the sleeve from the zero point is limited to the extent desired and the depth of the cut regulated. In this manner the depth of the cut may be adjusted very closely because a small axial movement of the spindle requires a considerable angular movement of the sleeve 30.

When engraving on flat surfaces the axial thrust caused by the spring 25 is taken up by a counter rest 40 arranged in line with the bearing in the same housing 1. When engraving on concave or convex surfaces a counterholder 41 of reversed shape is held on top of the bearing by an arm 42 which is secured to the frame of the machine in case movements of the spindle produce the design, but is fastened to the work table if the spindle is arranged stationary and the table performs the necessary movements.

When however parts with individual irregularities are to be engraved it would be impractical to fashion a form for each separate piece. In this case a guiding finger 43 is employed extending down into close proximity of the point of the cutter, lifting or depressing the complete bearing according to the irregularities of the surface worked upon. The guiding finger 43 is held by a screw 44 in a bracket 45 of U shape. One arm 47 of this bracket extends upwards and inwards over the point 34 and a seat for this point is provided in a button 46 pushed tight into the arm 47. A lower arm 48 extends inwards with a seat for the rim of the bushing 23. The bushing should be turned to have the head of the screw 26 stand in line with the large hole in the bushing. Thus the pressure of the spring 25 is taken up by the two arms 47 and 48 of the bracket 45 and the complete bearing together with the adjusting means is free to slide up and down in the bore of the housing 1.

If the weight of these parts is not sufficient to keep the finger 43 in contact with the surface of the work an additional spring 49 is provided. The adjustment of the cutter spindle up and down through operation of the lever 32 is not hindered in the least by this arrangement. The bracket 45 may be inserted or removed quickly as may be readily understood by the above description and the annexed drawings.

On some classes of work with a highly polished surface it would be very objectionable, if some of the engraving chips should get in under the guiding finger and cause scratches. To prevent this an arrangement has been made to blow away the chips when generated. This may be accomplished by an air pressure line or as has been shown in the drawings by a channel 50 which has been formed extending partways around the driving sheave 15 with an ever decreasing cross section thus increasing the quite perceptible draft caused by the belt and the fast rotating sheave and leading the air through a small hole 51 in the guiding finger 43 to the point of the cutter.

The construction described and shown has the special advantage that it may be used without change for the three different kinds of engraving described above without making any change in the bearing or the adjusting means and that the machine may quickly be changed to a different mode of working.

Having now fully explained my invention I do not wish to be understood as limiting myself to the exact details of construction, as obviously many modifications will occur to a person skilled in the art.

What I claim is:

1. In an engraving machine, a frame provided with a housing, a spindle within the housing adapted to support a cutter, supporting means for the spindle including a pair of telescoping sleeves in which the spindle operates, said sleeve having spaced bearings each engaging the spindle to support the same, a spring surrounding one of the sleeves and tending to move it axially of the spindle, and holding means for the supporting means releasable to permit the sleeves and spindle together with the bearings to be removed from the housing as a unit.

2. In an engraving machine, a frame provided with a housing, a unit free to slide within the housing comprising a spindle and bearing members in which the spindle is adapted to rotate, a spring yieldably supporting one of said bearing members and permitting it to slide within said housing, a tool carried by the spindle, releasable holding means for said unit forming a part thereof and a securing member for the holding means fixed on the housing and permitting removal of the unit without removal of the securing member.

3. In an engraving machine, a frame provided with a housing, a work spindle within the housing having one end terminating therein, bearings surrounding the spindle and being free to slide in the housing, a spring adapted to resist movement of the bearings in one direction, means projecting within the housing for sliding the bearings against the action of the spring to effect axial movement of the spindle to operative position, and releasable holding means for the bearings permitting them to be withdrawn from the housing as a unit.

4. In an engraving machine, a frame provided with a housing, a spindle adapted to support an engraving tool, supporting means for the spindle including bushings arranged to slide as a unit within said housing, each bushing having a separate thrust bearing engaging the spindle, means for moving the bushings from normal position to advance the spindle in one direction, and yieldable means for returning the bushings to normal position.

5. In an engraving machine, a frame provided with a housing, a spindle projecting within the housing, telescoping bushings free to slide within the housing, having opposed thrust bearings for supporting the spindle, one of said bushings having an opening for receiving a lubricating supply device, and means mounted axially of the spindle for sliding the bushings in opposite directions within the housing.

6. In an engraving machine, a frame provided with a housing, a spindle within the housing, bearings for the spindle free to slide within the housing and each engaging the spindle to support the same, a spring yieldably supporting one of the bearings, a sleeve rotatable within the housing in engagement with the spring, and a locking device for the sleeve adapted when the latter is rotated to one position to permit removal of the same from the housing by a sliding movement therein.

7. In an engraving machine, a frame provided with a housing, a tool holding spindle therein, a bearing within which the spindle is adapted to rotate, said bearing being free to slide within the housing, a spring tending to move the bearing axially in one direction, means for sliding the bearing within the housing against the action of the spring to move the tool to a predetermined operating position, a member secured upon the housing, holding means for the bearing rotatably adjustable upon said member to release position whereby the holding means and bearing may be withdrawn from the housing as a unit, and means for rotating the spindle.

8. In an engraving machine, a spindle for holding a cutter, driving means for rotating said spindle, a housing for the spindle, a spring pressed bearing for said spindle free to slide within the housing, a screw and nut connection adapted to move with the spindle for causing axial movement thereof, stopping means for limiting the relative movement in the screw and nut connection and means for adjusting said stopping means.

9. In an engraving machine, a frame, an axially movable spindle carried by the frame, a cutter mounted upon the spindle for operating upon the work piece, a guide adjacent the end of the spindle opposite the cutter and conforming substantially with the contour of that portion of the work piece to be operated upon, a member cooperating with the guide to control the movement of said spindle during the cutting operation, and means interposed between said member and the end of the spindle nearest thereto for moving the spindle relative to said member.

10. In an engraving machine, a frame, an axially movable bearing yieldably carried by the frame, a spindle carried by and rotatable in the bearing and held against longitudinal movement relative thereto, a cutter mounted upon the spindle, work engaging means connected with the bearing, means yieldably connecting said work engaging means with the frame, said means being responsive to the irregularities of the work whereby to effect control of the cutter and driving means for the spindle.

11. In an engraving machine, a frame, a holder slidably mounted upon the frame, a spindle carried by the holder having a cutter for operating upon the work piece, a spring tending to urge the holder toward the work piece, a work engaging member yieldably connected with the frame and being responsive to the irregularities of the work adapted to move said holder whereby to control the depth of the cut and driving means for the spindle.

12. In an engraving machine, a frame, a holder slidably mounted upon the frame, a spindle journaled in the holder and having a cutter for operating upon the work piece, a work engaging member responsive to the irregularities of the work adapted to move said holder whereby to control the depth of the cut, said member having a passage therethrough for conveying a fluid to the work adjacent the cutter, means yieldably urging said member in contact with the work and driving means for the spindle.

13. In an engraving machine an axially movable cutter and a member for controlling the axial position of said cutter adapted to convey a current of air approximately to the point of said cutter for removing chips.

14. In an engraving machine an engraving cutter, a rotary spindle holding said cutter, a housing, a bearing for said spindle free to move axially in the housing, and a member controlling the axial position of said bearing and adapted to convey a current of air to the surface worked upon.

15. In an engraving machine a rotary spindle for holding a cutter, driving means for rotating said spindle, means for receiving a current of air generated directly by said driving means and a guide for leading the current of air from the generating means to the surface worked upon.

16. In an engraving machine an engraving cutter, a rotary spindle for holding said cutter, a driving sheave for rotating said spindle, a guide vane enclosing part of the circumference of said driving sheave for catching the current of air generated by said driving sheave and the driving belt running thereon and means for leading the current of air onto the surface worked upon.

17. In an engraving machine a cutter, a spindle for holding said cutter, a driving sheave for rotating said spindle, guiding means partially surrounding the circumference of said sheave with decreasing cross section adapted to convey current of air generated by said sheave to the surface worked upon.

18. In an engraving machine, a cutter, a spindle carrying said cutter, a driving sheave rotating said spindle, means for controlling the axial adjustment of said spindle, and a member for guiding a bearing containing the above parts corresponding to the irregularities of the surface to be engraved, said member having a passage for conveying a current of air to the surface worked upon.

19. In an engraving machine, a frame, an axially movable spindle carried by the frame, a cutter mounted upon the spindle for operation upon the work piece, a guide adjacent the end of the spindle opposite the cutter conforming substantially with the contour of that portion of the work piece to be operated upon, a member cooperating with the guide to control the movement of said spindle during the cutting operation, and means between said member and the spindle for moving the latter in an axial direction.

20. In an engraving machine, a support, a bearing movable axially upon the support, a spindle carried by and movable with the bearing, a nut on the bearing, an adjusting screw threaded in the nut and cooperating parts for effecting axial movement of the bearing, one of said parts being movable in one direction to effect rotation of the screw and being movable in another direction to effect a sliding movement of the bearing without rotation of the screw.

21. In an engraving machine, a support, a spindle arranged for an axial sliding movement upon the support, cooperating parts for effecting axial movement of the spindle, one of said parts being movable in one direction to effect a relatively quick movement of the spindle and being movable in another direction to effect a relatively slow movement of the spindle and means for rotating the spindle.

22. In an engraving machine, a support, a bearing movable axially upon the support, a spindle rotatable in and movable axially with the bearing, controlling means for the bearing including a member movable in two directions to cause either a relatively quick or relatively slow axial movement of the bearing and means for rotating the spindle upon the bearing.

23. In an engraving machine, a support, a spindle rotatably and slidably mounted upon said support and having one end arranged to receive a tool, means for effecting a relatively quick and a relatively slow axial movement of the spindle in the direction of the work, said means including cooperating parts, one of which is mounted for rotation to effect a relatively slow movement of the spindle and another being mounted thereon to effect a relatively quick axial movement of the spindle without rotation of the latter and driving means for the spindle.

24. In an engraving machine, a support, a spindle movable axially upon the support and arranged to receive a tool, means for effecting axial movement of the spindle comprising cooperating parts, one of which is movable in different directions upon another to effect axial movement of the spindle at different speeds and means for driving the spindle in the different axial positions thereof.

25. In an engraving machine, a support, a bearing movable axially upon the support, a spindle rotatable in the bearing and movable axially therewith, the spindle being arranged to support a cutting tool, means for effecting axial movement of the bearing at different speeds including a control member movable in different directions to effect movement of the bearing at the different speeds and means for rotating the spindle in different axial positions.

26. In an engraving machine, a support, a bearing movable axially upon the support, a spindle rotatable in the bearing and movable axially therewith, means for effecting axial movement of the bearing, comprising relatively movable parts and a control member therefor arranged to operate the same without relative movement to effect axial movement of the bearing and also arranged to move one relative to another to effect axial movement of said bearing and a driving member for the spindle.

27. In an engraving machine, a frame, a bearing slidably mounted upon the frame, a spindle rotatable within the bearing and arranged to hold a cutting tool, a member rotatably supported by the bearing and adapted when rotated to effect axial movement of the bearing and a second member mounted for movement in different directions arranged when moved in one direction to rotate the first mentioned member and adapted when moved in another direction to effect axial movement of the bearing without rotation thereof.

28. In an engraving machine, a support, a spindle, a guiding member for the spindle movable axially in the support, a screw for operating said member to effect axial movement thereof, a lever for rotating said screw to afford a relatively slow axial movement of the spindle, said lever having a cam portion for effecting a relatively quick axial movement of the screw and guiding member and means for rotating the screw.

29. In an engraving machine, a support, a bearing for the spindle movable axially upon the support, a nut fixed upon the bearing in alinement with the spindle, a screw threaded in the nut, a rotary element carried by the support and movable axially thereon and arranged to rotate the screw, a control member mounted to swing upon said element and arranged to rotate the same and having a part for effecting axial movement of the bearing without rotation of the screw and a driving element for the spindle.

30. In an engraving machine, a frame, a bearing yieldably mounted for axial movement upon the frame, a spindle rotatable in the bearing, a cutter at one end of the spindle for engagement with the work, a bracket yieldably mounted upon the frame and having a portion at one end intersecting the axis of the spindle, a member alined with the spindle and engaging said portion to resist axial movement of the bearing in one direction, means for moving the bearing in an opposite direction, a member on the bracket arranged to engage the work adjacent the cutter and being responsive to the irregularities of the work and means for driving the spindle.

31. In an engraving machine, a frame, a bearing yieldably mounted for axial movement upon the frame, a spindle rotatable in the bearing, a cutter at one end of the spindle for engagement with the work, a bracket yieldably mounted upon the frame and having a portion at one end intersecting the axis of the spindle, a member alined with the spindle and engaging said portion to resist axial movement of the bearing in one direction, means for moving the bearing in an opposite direction, a member on the bracket arranged to engage the work adjacent the cutter and being responsive to the irregularities of the work, a support for the bearing carried by the frame, an arm on the bracket engaging the support whereby to limit movement of the bracket in one direction and means for driving the spindle.

32. In an engraving machine, a frame, a bearing mounted for axial movement upon the frame, a spindle rotatable in the bearing, a cutting tool on the spindle, an element guided by the frame and movable axially of the spindle and arranged to effect axial movement of the bearing, a control member on said element for effecting axial movement of said bearing, a bracket having a portion provided with a seat forming a rest for said element and having another portion cooperating with the frame to hold the bracket against movement in one direction, a member carried by the bracket arranged to engage the work adjacent the cutter and being responsive to the irregularities of the work, means yieldably connecting the bracket with the frame and a driving element for the spindle.

33. In an engraving machine, a frame, a spindle mounted for axial movement thereon, a cutter on the spindle for engaging the work, a bracket yieldably mounted upon the frame and arranged to be held against movement in one direction thereby, means interposed between the spindle and bracket arranged to resist movement of the spindle in one direction, a member connected with the bracket arranged to engage the work and being responsive to the irregularities thereof and a driving element for the spindle.

34. In an engraving machine, a housing, a bearing movable axially therein, a spindle rotatably mounted within the bearing, an element rotatably mounted in one end of the housing and forming a support for the bearing, said element having a laterally extending portion at one end thereof and a securing member for said element projecting from the housing and engaging said laterally extending portion to form a support for said element, the latter being movable to release position by a rotating movement within the housing.

35. In an engraving machine, a housing, a bearing movable axially within the housing, a spindle rotatably mounted within the bearing, an element rotatably mounted within one end of the housing and serving to retain the bearing therein, said element having a flange outside of the housing provided with a slot and a securing member connected with the housing and engaging the flange within the slot, said element being movable for release from the housing and the securing member by a rotary movement to a predetermined position.

36. In an engraving machine, a frame, an axially movable spindle carried by the frame, a cutter mounted upon the spindle for operation upon a work piece, a guide adjacent the end of the spindle opposite the cutter conforming substantially to the contour of that portion of the work to be operated upon by the cutter, said guide being mounted for movement relative to the frame, a member cooperating with the guide to control the movement of said spindle during the cutting operation and means interposed between said member and the spindle including a control member movable in one direction to effect a relatively slow movement of the spindle toward the work and movable in a different direction to effect a relatively quick movement toward the work.

37. In an engraving machine, a frame, an axially movable spindle carried by the frame, a cutter mounted upon the spindle for operation upon a work piece, a guide adjacent the end of the spindle opposite the cutter conforming substantially to the contour of that portion of the work to be operated upon by the cutter, said guide being mounted for movement relative to the frame, a member cooperating with the guide to control the movement of said spindle during the cutting operation, a feed screw interposed between the spindle and said member adapted when rotated to effect axial movement of the spindle and means including a control member arranged to effect rotation of the screw and also to effect axial movement of the spindle without rotation of the screw.

In testimony whereof I hereunto affix my signature.

LORENZ KONRAD BRAREN.